United States Patent
Eick et al.

(10) Patent No.: US 8,109,068 B2
(45) Date of Patent: Feb. 7, 2012

(54) AGRICULTURAL HARVESTER WITH ACCELERATED DRAPER BELT UNLOAD

(75) Inventors: Bronson C. Eick, Fremont, IA (US); Tad A. McDowell, Ottumwa, IA (US)

(73) Assignee: Deere & Company, Moline, IL (US)

( * ) Notice: Subject to any disclaimer, the term of this patent is extended or adjusted under 35 U.S.C. 154(b) by 228 days.

(21) Appl. No.: 12/399,079

(22) Filed: Mar. 6, 2009

(65) Prior Publication Data

US 2010/0223896 A1 Sep. 9, 2010

(51) Int. Cl.
*A01D 41/14* (2006.01)
*A01D 43/00* (2006.01)

(52) U.S. Cl. ............ 56/10.2 E; 56/181; 56/192

(58) Field of Classification Search ............ 56/10.2 E, 56/10.2 R, 10.8, 181, 192, 11.1
See application file for complete search history.

(56) References Cited

U.S. PATENT DOCUMENTS

| | | | | |
|---|---|---|---|---|
| 3,163,974 A | * | 1/1965 | Mack | 56/10.2 E |
| 3,470,681 A | * | 10/1969 | Saemann | 460/6 |
| 4,967,544 A | * | 11/1990 | Ziegler et al. | 56/10.2 R |
| 6,068,059 A | * | 5/2000 | Bajema et al. | 171/130 |
| 2006/0213168 A1 | * | 9/2006 | Remillard et al. | 56/10.2 R |
| 2006/0248868 A1 | * | 11/2006 | Otto et al. | 56/10.2 E |
| 2007/0119136 A1 | * | 5/2007 | MacGregor et al. | 56/10.2 H |
| 2007/0204582 A1 | * | 9/2007 | Coers et al. | 56/10.2 E |

* cited by examiner

*Primary Examiner* — Thomas Will
*Assistant Examiner* — Joan Misa

(57) ABSTRACT

An agricultural harvester includes a base unit and a header coupled with the base unit. The header includes a frame; at least one draper belt; a header lift detector providing an output signal indicating a lift state of the header; and a draper belt accelerator receiving the output signal from the header lift detector and accelerating each of the draper belts upon receipt of the output signal.

14 Claims, 2 Drawing Sheets

AGRICULTURAL HARVESTER WITH ACCELERATED DRAPER BELT UNLOAD

FIELD OF THE INVENTION

The present invention relates to agricultural harvesters, and, more particularly, to agricultural harvesters including a draper cutting platform.

BACKGROUND OF THE INVENTION

An agricultural harvester, such as a windrower or combine, is a large machine used to harvest a variety of crops from a field. In the case of a combine, during a harvesting operation, a header at the front of the combine cuts ripened crop from the field. In the case of thinner stemmed crops such as soybeans, wheat, etc. which may be cut with a sickle bar carrying a plurality of knives, the header may also be known as a cutting platform. A feederhouse supporting the header transfers the crop material into the combine. Threshing and separating assemblies within the combine remove grain from the crop material and transfer the clean grain to a grain tank for temporary holding. Crop material other than grain exits from the rear of the combine. An unloading auger transfers the clean grain from the grain tank to a truck or grain cart for transport, or to another receiving bin for holding.

In the case of a windrower, during a harvesting operation, a header at the front of the windrower cuts ripened crop from the field. The crop is transported to the rear of the header and forming shields form a windrow of the crop between the tires of the vehicle for natural dry down of the crop. A subsequent field operation picks up the windrows for further processing, such as separating and cleaning in the case of grain crops, or baling or chopping in the case of hay.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform used on a combine has two side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

With wider draper platforms from 25' to 40' as described above, controls are provided to allow an operator to finely tune the speeds of the draper belts, reel and cutter bar based on the particular crop and operating conditions.

Typically when windrowing a field the operator will use one of two methods. One method is to make a few passes around the field and then cut back and forth laying the windrows parallel to each other. The second method is to cut around the field in one direction working from the outside in. Generally the corners are made square by cutting out, picking up the header (avoiding dragging it through a crossing windrow), turning around and lowering the header before entering crop.

When a row is completed and the head pulls out of crop it takes a moment for the belts to unload the crop into the windrow. The operator generally raises the head and reduces ground speed to insure the windrows don't overlap. If the operator does not pause and let the draper belts unload before crossing another windrow, the windrows overlap and are very difficult to pick up with a combine.

What is needed in the art is a draper cutting platform that can be operated in an end-of-row condition such that the crop does not cross windrows.

SUMMARY OF THE INVENTION

The invention in one form is directed to an agricultural harvester, including a base unit and a header coupled with the base unit. The header includes a frame; at least one draper belt; a header lift detector providing an output signal indicating a lift state of the header; and a draper belt accelerator receiving the output signal from the header lift detector and accelerating each of the draper belts upon receipt of the output signal.

The invention in another form is directed to a method of operating a cutting platform for use with an agricultural harvester. The method includes the steps of: operating at least one draper belt at a selected first operating speed during normal harvesting; detecting a lift state of the cutting platform; and operating the at least one draper belt at a second operating speed upon detection of the lift state. The second operating speed is greater than the first operating speed.

DETAILED DESCRIPTION OF THE INVENTION

Figure 1:
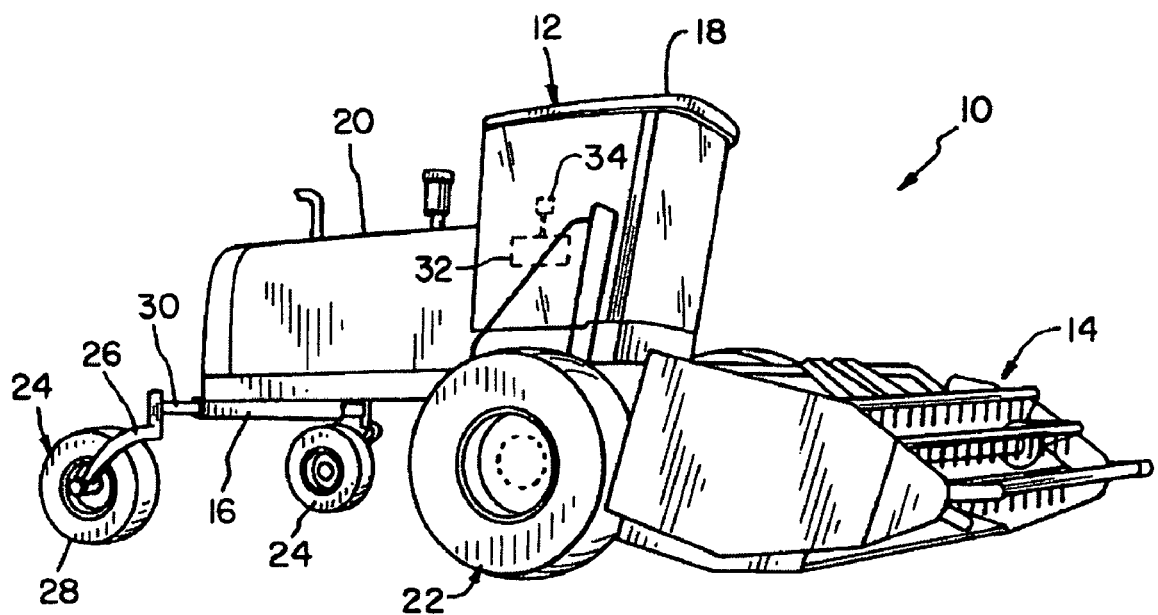
FIG. 1 is a perspective view of an embodiment of a windrower of the present invention.
Figure 2:
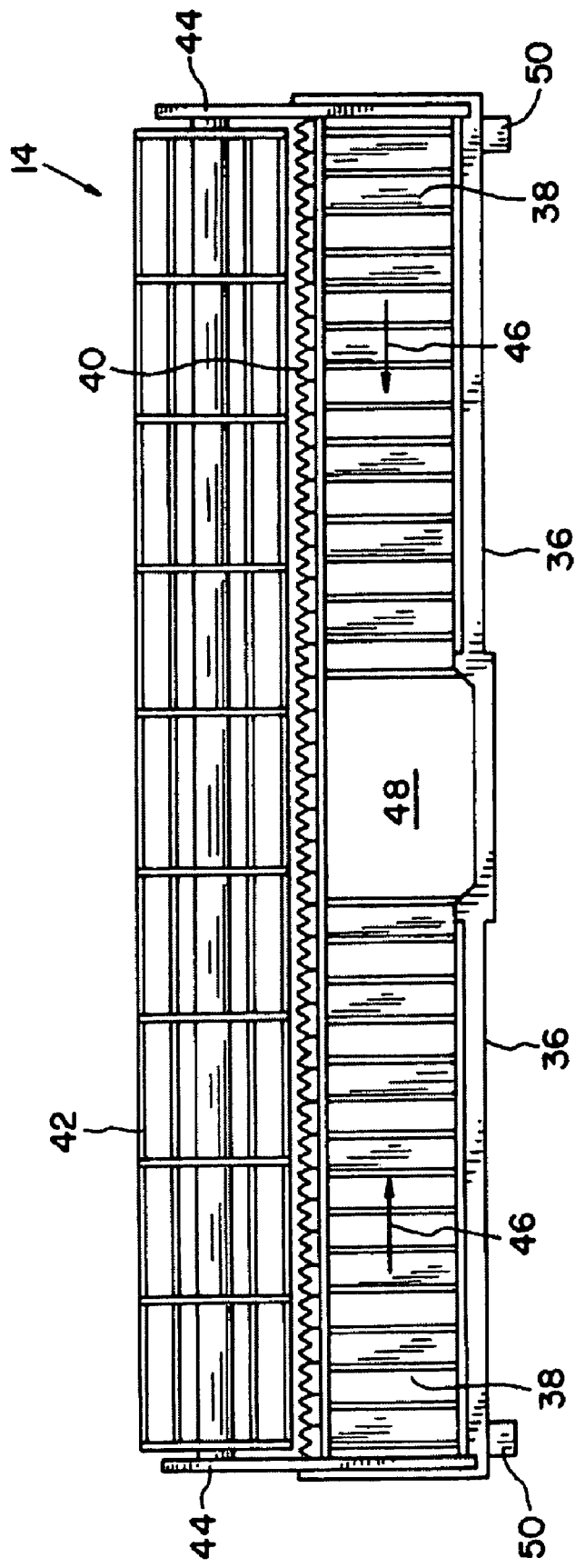
FIG. 2 is a top view of the draper cutting platform shown on the windrower of FIG. 1.

Referring now to the drawings, and more particularly to FIGS. 1 and 2, conjunctively, there is shown a work machine in the form of a windrower 10 of the present invention. Windrower 10 generally includes a traction unit 12 carrying a draper cutting platform 14. Draper cutting platform 14 may also alternatively be referred to as a "header" herein.

Traction unit 12 includes a frame 16 carrying typical components such as an operator cab 18, engine compartment 20 housing an internal combustion (IC) engine (not shown), a pair of drive wheels 22, and a pair of rear caster wheel assemblies 24. Drive wheels 22 are typically at the front of traction unit 12 and caster wheel assemblies 24 are typically at the rear of traction unit 12. Drive wheels 22 are connected via respective drive motors with a dual path hydrostatic transmission (not shown). It is also possible to drive the drive wheels 22 with a different type of adjustable transmission, such as a hydromechanical or electromechanical transmission.

Each caster wheel assembly 24 includes a wheel arm 26 and a caster wheel 28. Wheel arm 26 is pivotably coupled at the upper end with machine frame 16, in particular, at the outboard end of a rear axle 30 forming part of machine frame 16. Wheel arm 26 is shown as a single arm which curves around to the side of wheel 28, but can also be configured as a fork with distal ends on opposite sides of wheel 28.

An electrical processing circuit 32, typically mounted within operator cab 18 to the right or rear of the operator, is configured as one or more controllers. In the embodiment shown, controller 32 may include multiple controllers (not shown). For example, controller 32 may include an engine control unit (ECU) which electronically controls operation of the IC engine within engine compartment 20, and is coupled with a plurality of sensors associated with operation of the IC engine. Further, the ECU may receive output signals from a vehicle control unit (VCU) representing vehicle control parameters input by an operator, such as a commanded ground speed (indicated by a position of the throttle and/or hydrostatic pedal) or a commanded direction of windrower 10 (indicated by an output signal from a steering sensor representing an angular orientation of the steering wheel, or position of joystick(s)). Further, controller 32 may include a transmission control unit (TCU) which electronically controls operation of the transmission, and is coupled with a plurality of sensors associated with operation of the transmission. The ECU, VCU and TCU may be physically separate from each other and coupled together via a bus structure providing two-way data flow, such as a controller area network (CAN) bus. Such controller schemes are known and thus not specifically shown in the drawings or described in detail herein.

A header lift detector in the form of an operator input device, particularly in the form of a depressible switch 34, is coupled with controller 32. Switch 34 is depressed by the operator to lift draper cutting platform 14 and provides an output signal to controller 32. Alternatively, the operator input device could be a touch screen, etc.

Moreover, rather than using an operator actuated switch to place draper cutting platform 14 in a lift state, it is also possible to use other types of header lift detectors. For example, the header lift detector can be in the form of a position sensor associated with the lift cylinder(s) for lifting the draper cutting platform 14 relative to traction unit 12. The position sensor can provide an output signal to controller 32 when the cutting platform is at a predetermined height indicating that the cutting platform 14 is in a lift state. Alternatively, the header lift detector can be in the form of a global positioning system (GPS) which senses when windrower 10 is at an end-of-row condition and sends an output signal to controller 32.

Draper cutting platform 14 is typically detachably mounted at the front end of traction unit 12 below operator cab 18 using a lift assembly in the form of a pair of lift arms (not shown). Draper cutting platform 14 generally includes a frame 36, a pair of transverse side draper belts 38, a cutterbar assembly 40, a reel 42 and a pair of reel lift arms 44.

Draper cutting platform 14 is shown as a rigid draper platform in the illustrated embodiment, but could also be configured as a flexible draper. Further, draper cutting platform 14 is shown as not including a center fore-and-aft draper belt between side draper belts 38, but could be configured with a permanent or removable center draper belt. When the center draper belt is in the installed position, draper cutting platform 14 may be used as a harvester, and when in an uninstalled position, draper cutting platform 14 may be used as a swather or windrower. Additionally, draper cutting platform 14 is shown for use with windrower 10, but could be configured for use with other applications, such as for use with a traction unit in the form of a combine. Other configurations are also possible and within the scope of this invention.

Reel lift arms 44 are pivotally coupled at one end thereof with opposite outboard ends of frame 36. Reel lift arms 44 also rotationally carry reel 42 at opposite ends thereof. Each reel lift arm 44 may be selectively moved up and down through controller 32 using a hydraulic cylinder, and the pair of hydraulic cylinders are typically coupled in parallel so that they move together upon actuation.

Cutterbar assembly 40 is a sickle bar cutter in the illustrated embodiment. Cutterbar assembly 40 is driven by a suitable mechanical drive at one end of draper cutting platform 14. Alternatively, cutterbar assembly 40 may be a split cutterbar with a common drive or separate drives for each cutterbar.

Draper belts 38 travel in a transversely inward direction as indicated by arrows 46, and deposit the cut crop material into an open area 48 between the draper belts 38, forming a windrow of the cut crop material. Each draper belt 38 is separately driven by a respective drive motor 50 which is coupled with a respective end roller (not shown) carrying a corresponding draper belt 38. In the illustrated embodiment, each drive motor 50 is assumed to be a hydraulic motor under concurrent control of controller 32. The drive motors 50 could also be independently controlled, or could be in the form of electric motors which are under control of controller 32.

According to an aspect of the present invention, draper belts 38 are controllably operated to accelerate to a higher operating speed when draper cutting platform 14 is in a lift state. The "lift state" could correspond to an operator actuated switch, a lift height of draper cutting platform 14, or an absolute position of windrower 10 within a field. For example, as indicated above, an operator can depress a switch 34 when the cutting platform 14 is at the end of a row. Alternatively, a position sensor can detect the raised position of draper cutting platform 14 when the cutting platform is manually raised at an end of a row. As another example, a GPS can provide a signal that the windrower has moved into the end rows of a field, assuming that the cutting platform has been manually or automatically raised at the edge of the end rows.

Upon detection of a "lift state" of draper cutting platform 14, controller 32 controls drive motors 50 to accelerate side draper belts 38 to a higher operating speed and discharge the cut crop material into open area 48 before windrower 10 crosses over the other end rows at the end of the field. Drive motors 38 and controller 32 together act as a draper belt accelerator to accelerate draper belts 38 to a speed which is higher than a normal operating speed. Draper belts 38 are preferably simultaneously controlled using controller 32, but could also be separately and independently controlled. The draper belts can then continue to operate at the higher speed for a predetermined period of time, or until the draper cutting platform 14 is returned to at or near an operating height when an operator again depresses switch 34, or the lift cylinder sensor detects the cutting platform at or near an operating height.

In the embodiment illustrated in FIGS. 1 and 2, the draper belts 38 are accelerated on a windrower. However, it is also possible that this same inventive concept can be used on other types of work machines with draper belts. For example, it may be possible to operate a combine with a draper cutting platform such that the draper belts are accelerated to a higher operating speed depending on the lift state of the cutting platform and/or position of the combine with a field. It will be appreciated that if the operating speed of the draper belts is increased on a combine, it may be desirable to increase other component operating speeds, such as the cylinder speed, etc.

Moreover, in the embodiment illustrated in FIGS. 1 and 2, the draper belts are accelerated upon occurrence of a header state in the form of a header lift state, detected or assumed in various ways as described above. However, it is possible that the draper belts can be accelerated upon an operator input or detection of some other state other than a lift state associated with draper cutting platform 14. For example, it may be possible that the header state could correspond to an automatic detection of crop load on the draper cutting platform 14, such as may occur under certain slugging conditions, etc.

Having described the preferred embodiment, it will become apparent that various modifications can be made without departing from the scope of the invention as defined in the accompanying claims.

The invention claimed is:

1. An agricultural harvester, comprising:
   a traction unit;
   a header coupled with said traction unit, said header including:
     a frame;
     at least one draper belt;
     a header lift detector configured to provide an output signal indicating a lift state of said header; and
     a draper belt accelerator configured to receive said output signal from said header lift detector and said draper belt accelerator also being configured to accelerate each of said at least one draper belt upon receipt of said output signal.

2. The agricultural harvester of claim 1, wherein said header lift detector comprises one of:
   a position sensor;
   an operator input device; and
   a global positioning system (GPS).

3. The agricultural harvester of claim 2, wherein said operator input device comprises a depressible switch.

4. The agricultural harvester of claim 1, wherein said draper belt accelerator includes an electronic controller.

5. The agricultural harvester of claim 1, wherein said draper belt accelerator receives said output signal and accelerates each of said draper belts for a predetermined period of time.

6. The agricultural harvester of claim 1, wherein said draper belt accelerator receives said output signal and accelerates each of said draper belts until said header is lowered to an operating position.

7. The agricultural harvester of claim 1, wherein said at least one draper belt includes a pair of transverse side draper belts.

8. A method of operating the agricultural harvester of claim 1, said method comprising the steps of:
   operating said at least one draper belt at a selected first operating speed during normal harvesting;
   detecting a lift state of said header; and
   operating said at least one draper belt at a second operating speed upon detection of said lift state, said second operating speed being greater than said first operating speed.

9. The method of claim 8, wherein said lift state occurs at an end of row condition.

10. The method of claim 8, wherein said accelerated second operating speed occurs for a predetermined period of time.

11. The agricultural harvester of claim 8, wherein said draper belt accelerator receives said output signal and accelerates each of said draper belts until said header is lowered to an operating position.

12. The method of claim 8, wherein said first operating speed and said second operating speed are effected using an electronic controller.

13. The method of claim 8, wherein said detecting step is carried out using one of:
   a position sensor;
   an operator input device; and
   a global positioning system (GPS).

14. The method of claim 13, wherein said operator input device comprises a depressible switch.

* * * * *